United States Patent Office 3,749,573
Patented July 31, 1973

3,749,573
SILVER HALIDE PHOTOSENSITIVE ELEMENT CONTAINING HYDROPHILIC COLLOID LAYERS HARDENED WITH α,β-BIS-ACRYLOYLAMIDO-ETHYLENEGLYCOL
Alfred Froehlich, Marly-le-Grand, Switzerland, assignor to Ciba-Geigy AG, Basel, Switzerland
No Drawing. Filed Aug. 3, 1971, Ser. No. 168,783
Claims priority, application Switzerland, Aug. 11, 1970, 12,029/70
Int. Cl. G03c 1/30, 5/26
U.S. Cl. 96—50 R   9 Claims

ABSTRACT OF THE DISCLOSURE

A hydrophilic colloid present in a photographic layer material is crosslinked with α,β-bis-acryloylamidoethyleneglycol or α,β-bis-methacryloylamido-ethyleneglycol.

---

The present invention relates to a process for crosslinking hydrophilic colloids containing amino, imino and/or hydroxyl groups and which are present in photographic layer material.

The process is characterised in that the colloids are reacted with at least one crosslinking agent of the formula (1) 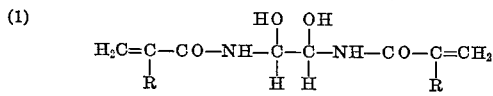

in which R is hydrogen or methyl.

According to the invention, therefore, either the compound of the formula (2) 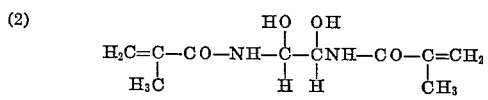

or preferably the compound of the formula (3) 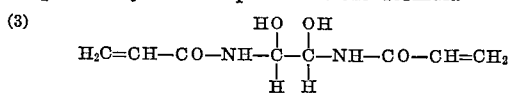

or both compounds together are used as crosslinking agent.

The compounds of Formula 1 are known and are conveniently obtained by reacting glyoxal with acrylic acid and/or methacrylic acid amide.

The compounds of Formula 1 are according to the invention used as crosslinking agents (hardeners) for water-soluble polymers, such as polyvinyl alcohol, gelatine or gelatine derivatives, in photographic layer materials. The crosslinking agents may be used for hardening water-soluble polymers, e.g. gelatine, present in baryta or similar coatings for photographic papers, or in photographic emulsion layers containing, for example, silver halide, colour couplers or dyestuffs. Further, they can be used in various auxiliary layers of photographic materials, such as for example back, under, intermediate, filter, antihalo, receiving, transmission and covering layers. Furthermore, these layers can consist of mixtures of various different hydrophilic colloids. Thus, for example, an emulsion, containing gelatine may also contain polyvinyl alcohol and/or alginic acid and/or synthetic copolymers of various other vinyl compounds, such as vinyl acetate, vinyl pyrrolidone, maleic anhydride and the like.

The emulsions or layers may contain additives of various types, such as for example silver halide, pigments, such as barium sulphate, titanium dioxide, silicon dioxide or those of an organic nature, such as colour pigments, image dyestuffs, colour couplers, sensitizers, filter, antihalo and screen dyestuffs, stabilisers, UV-absorbers, optical brightening agents and other crosslinking agents.

The reaction of the hydrophilic colloids with the compounds of Formula 1 proceeds easily. The good solubility of these compounds is of particular importance. Since they are non-ionic, water-soluble compounds, the ionisation state (the ionic strength) of the colloid solutions is not changed. The compounds are however also easily soluble in organic solvents and can be added in this form, e.g. in ethyl or methyl alcoholic solution or in their mixtures with water, to the layer-forming solutions or emulsions of the hydrophilic colloids.

The crosslinking agents of Formula 1 can be introduced into the hydrophilic colloids which are to be crosslinked and/or hardened, before or after the application of the emulsions onto the support of the photographic material.

The compounds of Formula 1 can also be added to the customary photographic treatment baths, such as developing, fixing and stopping baths. The most advantageous effect is obtained in virtually neutral baths, e.g. a preliminary bath before the developer bath. Such baths keep particularly well. An increased crosslinking is also achieved with non-crosslinked or slightly crosslinked colloids in the pH region from 4 to 14, preferably between 6 and 8, particularly at an elevated temperature. As a result, it becomes possible to process without damage, for example, completely unhardened photographic emulsions at temperature of 30° C. and above. For this there are needed about 1 to 50 g., preferably 10 to 25 g. of a compound of Formula 1 per litre of treatment bath.

The compounds of Formula 1 are very stable in neutral, aqueous solution. Photographic properties are substantially uninfluenced by the crosslinking using compounds of Formula 1.

If virtually neutral aqueous solutions of said hydrophilic colloids are kept together with the crosslinking agents for a prolonged period at an elevated temperature, e.g. 1 to 6 hours, at 30–40° C., then the ability of these compounds to crosslink the emulsions prepared with them does not materially decrease.

A particular advantage, in the use of these hardening agents with large quantities of casting solution, lies in the fact that the viscosity change of the solutions is not influenced. This is shown if, for example, to a silver bromide emulsion containing 10% gelatine then an added 3%, based on the gelatine, of the compound of Formula 3 and this emulsion is kept for 1 to 6 hours at 40° C. With a comparative test with gelatine without a hardener, the values for viscosity change and hardening given in the following table were found.

| Period of residence, hours | Change in viscosity, percent | | Melting point, ° C., measured 24 hours after pouring the emulsion | |
|---|---|---|---|---|
| | No hardener | With that of Formula 3 | No hardener | With that of Formula 3 |
| 0 | 0 | 0 | 36 | 90 |
| 1 | 0 | 0 | 36 | 90 |
| 2 | −5 | −7 | 36 | 90 |
| 4 | −9 | −10 | 36 | 90 |
| 6 | −13 | −13 | 36 | 90 |

If this emulsion is allowed to stand for 12 days at 0–2° C. and if it is then melted at 40° C., it shows no change in viscosity compared with an emulsion without the addition of a hardener.

In most cases it suffices to add the products to be used according to the invention as an aqueous solution to an aqueous solution of the hydrophilic colloid while stirring well. There may however also be used the customary methods of distribution using kneading and/or shearing forces or supersonics.

It is therefore possible, for example, to bring together a solution of the hardening agents in water, ethanol or methanol, at normal or slightly elevated temperature with gelatine and to cast the gelatine, possibly containing silver halide and/or other materials for producing photographic images, onto a support in the customary way to form a layer which may be dried. The layer can then be left to itself at an elevated temperature for a time, e.g. up to 18 hours, or at room temperature. As a result, the hardening occurs quickly and to an increasing extent. The melting point of the gelatine is increased considerably, e.g. by 25 to 60° C.

The amount of hardening agent to be used depends on the desired degree of hardness, but preferably amounts to 0.1 to 10% by weight, based on the weight of the dry gelatine.

A particular advantage of the present crosslinking agents lies in that they are, even when used in a low concentration, capable of conferring on the gelatine layers in a short time, e.g. after 18 to 24 hours, a sufficient degree of hardness without a catalyst being used or the temperature and air humidity having to be raised above the normal values of the surroundings. In this respect the hardeners of Formula 1 differ advantageously from N,N'-bis-acryloylethylene diamine the use of which for the same purpose is already known.

It is also advantageous that there is with the crosslinking according to the invention with the compounds of Formula 1 no change in pH of the colloid layer. The melting point of a hardened gelatine remains above 90° C., for example, even after prolonged storage at temperatures around 40° C. and a relative humidity of about 70%. The crosslinking is therefore very stable. The degree of hardening of the gelatine is not altered substantially even by acids or bases at a pH of 1 to 12 this indicating the high degree of resistance to hydrolysis of the hardener/gelatine bond.

In addition, it is possible in the case of these compounds with a low molecular weight, because of their good ability to diffuse in a multi-layer material, to add them merely to the auxiliary layers in order to obtain a hardening of the neighboring silver halide layers by diffusion.

In order to obtain special effects, the compounds of Formula 1 can also be combined with other crosslinking agents, e.g. those which develop their full hardening effect in the pH range from 0.5 to 1. In this way a uniform hardening is obtained in the pH range from 0.5 to 14. This possibility is of particular interest, for example, for colour photographic material which is treated with strongly acidic baths.

The following examples in which the percentages are by weight, will serve to illustrate the invention.

EXAMPLE 1

To 20 ml. of a 10% gelatine solution there are in each case added 10 ml. water and 0.5, 1 and 2 ml. of a 2% aqueous solution of the compound of Formula 3. The solutions are each cast onto a film 18 cm. by 24 cm. and the films are dried at a surrounding air temperature of 38° C. After storing for 24 hours, the melting points of the three gelatine layers are respectively 67° C., 85° C. and more than 95° C.

EXAMPLE 2

1 kg. silver bromide emulsion, containing 8% gelatine (pH=7) is reacted with 4% hardener of the Formula 3, based on the gelatine, in the form of a 2% aqueous solution and is poured onto a film at 38° C. After drying and storing for 24 hours under normal room conditions, the layers have melting points greater than 95° C.

EXAMPLE 3

On four occasions in each case 20 ml. silver halide emulsion, containing 8% gelatine, are diluted with 10 ml. 6% gelatine solution and 4% of the weight of the gelatine of the compound of Formula 3 in the form of a 2% solution are then added. The samples are set respectively to a pH of 5, 6, 7 and 8 and are cast onto a film 18 cm. x 24 cm. in size. Drying is carried out at the temperature of the surrounding air, i.e. 38° C. After storing for 24 hours the melting points measured in water are respectively 90° C., 95° C., 95° C. and 95° C. If measured in hydrochloric acid of pH 1, then the melting points are 77° C., 88° C., 95° C. and 95° C. Measured in a sodium hydroxide solution of pH 12, they are 89° C., 95° C., 95° C. and 95° C.

EXAMPLE 4

80 ml. of a silver halide emulsion, containing 8% gelatine, are diluted with 40 ml. of a 6% gelatine solution, reacted with 4% of the weight of the gelatine of the compound of Formula 3 in the form of a 2% aqueous solution and set to a pH of 7. 30 ml. of this emulsion are poured onto a film immediately and after 1, 2 and 3 hours, the film being 18 cm. x 24 cm., and are dried at a temperature of the surrounding air at 38° C. The melting point of the layers is after storing for 24 hours 95° C.

EXAMPLE 5

20 ml. 10% gelatine solution are diluted with 10 ml. water and reacted with 4 ml. 1% solution of the compound of Formula 2, poured onto a film 18 x 24 cm. and dried for 24 hours at an air temperature of 38° C. The melting point of the gelatine layer is 95° C.

EXAMPLE 6

30 ml. of a 5% polyvinyl alcohol solution are reacted with 1.6 ml. of a 2% solution of the compound according to Formula 3, poured onto a film 18 cm. x 24 cm. and dried for 24 hours at an air temperature of 38° C. The melting point of the polyvinyl alcohol layer is now 74° C.

EXAMPLE 7

20 ml. 10% gelatine solution are diluted with 10 ml. water, poured onto a film 18 cm. x 24 cm. and dried. The gelatine layer has a melting point of 39° C. If the layer is bathed for 5 minutes in a photographic developer at 30° C., which contains 2% of the compound of Formula 3, then is soaked for 15 minutes and dried at 40° C., the melting point of the gelatine is 86° C. If under the same conditions 4% of the compound of Formula 3 is added to the developer, the melting point is greater than 95° C.

If the same method is used as indicated above, but at 40° C. instead of 30° C., then both melting points are above 95° C.

EXAMPLE 8

If a photographic silver bromide layer is produced as indicated in Example 2, but without a hardener of Formula 3 and the pieces of film exposed in the normal way are bathed before development for 5 minutes at 30° C. in a bath containing 8% of the compound of Formula 3 and having a pH of 7.9 (sodium phosphate buffer), then the coated film can after a short soaking (5 seconds) be developed at 30° C. without suffering damage in a customary developing and fixing bath and be fixed. If instead of the hardening bath only a water bath is used, then the layer is damaged at the points of contact or at the edges by complete or partial stripping off of the layer.

EXAMPLE 9

There are added to 40.5 ml. of a 6% gelatine solution of pH 6 30 ml. of a 0.33 molar solution of the hardener of Formula 3 of pH 6. After mixing 5 ml. of it are poured onto several glass plates 13 cm. x 18 cm. and dried for 2.5 hours at 23° C. and 55% relative humidity. Then the samples are stored for several days either in a normal climate (21° C., 50% RH) or in a conditioning cupboard (43° C., 69% RH) and the hardening is measured by the indentor method.

For measurement the samples are allowed to swell for 20 minutes in distilled water at 25° C. and are then moved linearly in the same medium under an indentor with increasing weight. Then the indentor penetrates from a certain load into the layer and produced scratch traces. The applied weight at the beginning of the scratches is a measure of the extent of the elastic modulus, the plastic deformation and the swelling of the gelatine sample. Here higher weights correspond to an increasing degree of crosslinking. The increase of the degree of crosslinking based on the applied indentor weight is indicated in the following table.

|  | Ind. wt., g., at— | |
|---|---|---|
|  | 21° C., 50% RH | 43° C., 69% RH |
| Storage time: |  |  |
| 3 hours | 0 | 220 |
| 12 hours | 0 | 355 |
| 1 day | 5 | 440 |
| 2 days | 10 | 520 |
| 4 days | 30 | 620 |
| 8 days | 70 | 720 |
| 16 days | 160 | 795 |
| 32 days | 265 | 800 |

EXAMPLE 10

1 kg. silver bromide emulsion, containing 8% gelatine (pH=7) is reacted with 3.2 g. hardener of the Formula 3 in the form of a 25% aqueous solution and is poured onto a film. There is prepared as a comparative sample a layer of the same emulsion without the addition of the hardener. The films are dried at an air temperature of 34° C. A wedge is copied onto a strip of these layers and the strip is in each case treated with the following developer:

| 4-methylaminophenol sulphate | g | 1 |
|---|---|---|
| Hydroquinone | g | 4 |
| Sodium carbonate (anhydrous) | g | 10 |
| Sodium sulphite (anhydrous) | g | 20 |
| Potassium bromide | g | 2 |
| Water | ml | 963 |

Soaking is then carried out for 2 minutes and then fixing for 4 minutes in the following bath:

| Sodium thiosulphate | g | 200 |
|---|---|---|
| Sodium sulphite (anhydrous) | g | 15 |
| Water | ml | 785 |

Soaking is then carried out for 10 minutes and then drying.

|  | After 24 hours' storing at room temperature | | |
|---|---|---|---|
|  | Melting point, ° C. | Cloudiness | Gamma |
| Comparative sample | 36 | 0.15 | 1.80 |
| 4% of compound of Formula 3 | 95 | 0.13 | 1.70 |

I claim:

1. A process for crosslinking a hydrophilic colloid containing amino, imino and/or hydroxyl groups, said colloid being present as a layer in a photographic material comprising a support having thereon at least one hydrophilic colloid emulsion layer containing silver halide which process comprises treating said photographic material with an effective crosslinking amount of a compound of the formula

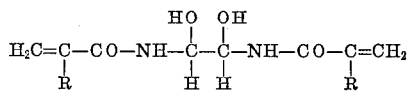

which R represents a hydrogen atom or a methyl group.

2. A process as claimed in claim 1, in which said hydrophilic colloid comprises gelatin.

3. A process as claimed in claim 1 which comprises crosslinking the colloid with the compound of the formula

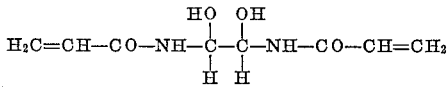

4. A process claimed in claim 1 which comprises incorporating said compound as crosslinking agent in the hydrophilic colloid before the colloid is cast to form a layer in the photographic material.

5. A process as claimed in claim 1 which comprises introducing said compound as crosslinking agent into a hydrophilic colloid layer of the photographic material after the layer has been cast on a support.

6. A process as claimed in claim 5 which comprises treating the photographic material with a photographic processing bath containing said compound as crossslinking agent.

7. A process as claimed in claim 6 which comprises introducing said compound as crosslinking agent into the photographic material before treating the latter with a silver halide developer.

8. A photographic material which comprises a support and at least one hydrophilic colloid silver halide, emulsion layer, said colloid containing amino-, imino- and/or hydroxyl groups crosslinked with an effective hardening amount of a compound of the formula

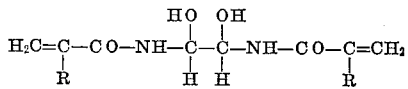

where R is hydrogen or methyl.

9. A photographic material according to claim 8 in which the hydrophilic colloid is gelatine.

References Cited

UNITED STATES PATENTS

| 2,154,895 | 4/1939 | Fricke et al. | 96—111 |
| 2,059,817 | 11/1936 | Sheppard et al. | 96—111 |
| 3,455,892 | 7/1969 | Froehlich | 96—111 X |

FOREIGN PATENTS

| 994,869 | 6/1965 | Great Britain | 96—111 |

NORMAN G. TORCHIN, Primary Examiner

W. H. LOUIE, JR., Assistant Examiner

U.S. Cl. X.R.

96—50 PT, 66 R, 61 R, 62 R, 111; 260—117